Patented Oct. 12, 1943

2,331,364

UNITED STATES PATENT OFFICE 2,331,364

PROCESS FOR DEPILATING CARCASSES

Gene Abson, Chicago, Ill., assignor to Chicago Testing Laboratory, Inc., Chicago, Ill., a corporation of Illinois No Drawing. Application March 27, 1940,
Serial No. 326,212

7 Claims. (Cl. 17—45)

This invention relates to a process for treating the carcasses of animals, particularly edible carcasses, for the purpose of removing the hairs, bristles, feathers or similar exterior growths therefrom to improve the marketability of said carcasses, and also relates to a superior material for carrying out such process.

I am aware that it has been proposed to remove the bristles from hogs or other animals by spraying or dipping the carcasses in (1) molten rosin and oil, (2) rosin, pitch and paraffin, and (3) rosin and asphalt, then chilling the adhering compound usually with water and then manually or otherwise stripping from the carcass the coating carrying the imbedded hairs or bristles. This method is effective, but when melted and reused at temperatures ranging between about 275° F. to 325° F., such reuse being necessary to render the processes economically feasible, the compounds mentioned above lose volatile materials very rapidly and frequently become so viscous after only a few days use as to interfere with proper manipulation and must be discarded; this is especially true when compounds containing rosin are used in spray application systems.

It has been proposed to rejuvenate these compounds by the addition of oils such as cottonseed or soy bean, but this is expensive as well as unsatisfactory because after a few additions of oil, the compound loses its desirable physical properties due to excessive amounts of oil being present and is not of the proper consistency for satisfactory stripping or removal even when cooled. Then, too, alkalies such as lime or sodium salts used in the wash water or scalding water, react with the abietic or other acids in the rosin and elevate its melting point so that it is no longer fluid at the temperatures which of necessity must be used in applying the liquefied material. Furthermore, compounds containing rosin give off vapors, smoke and odors which are irritating and otherwise objectionable.

I have found in accordance with my present invention that a coating material comprising at least 80% of an asphaltic, or other bituminous material, eliminates many of the above disadvantages associated with rosin or rosin compounds. I have further found that asphaltic compounds of the highly susceptible type, that is, ones which show wide differences in consistency over a range of temperatures, can be successfully used; these susceptible materials can be contrasted, for instance, with oxidized or airblown asphalts having a narrow range of susceptibility; or they can further be characterized as having a low "viscosity index" or high susceptibility factor. These highly susceptible asphalts, while fluid at temperatures of about 250° F. to 350° F., are sufficiently coherent at temperature below about 150° F., to hold the hairs and permit manual removal or lifting of the coating as a coherent layer or film by a stripping operation.

The asphaltic materials which typify the kind of material best adapted to my process are (1) those derived from the thermal reactions encountered in the cracking of crude petroleum, or its fractions or residues to produce gasoline and other low boiling point hydrocarbons; these may be from processes using pressures above atmospheric and relatively high temperatures. (2) Asphalts derived by precipitation of petroleum or its residues from solutions with butane, propane, hexane or the like; or by selective solution in such liquids as phenol, furfural, sulphur dioxide or the like. (3) Bituminous materials derived from tars produced in the destructive distillation of coal, wood or other vegetable matter, or in the production of gas from petroleum. However, it should be noted that if compounds such as phenols, cresols, or the like are present, the tars must be so treated that no odor or taste is imparted to the flesh of the carcass. (4) Mixtures or combinations of any of the above with asphalts or bitumens derived from any other manufacturing process, such as vacuum and/or steam distillation, oxidation, hydrogenation, dehydrogenation, polymerization, catalytic treatment or the like including the products of distillation from crudes normally producing susceptible asphalts, such as California, Wyoming, or Montana. (5) Any of the products represented by any of the above classifications to which has been added a small portion of material which is relatively non-volatile at operating temperatures of about 250° F. to 350° F., such as a relatively hard natural or synthetic wax such as montan or carnauba or petrolatum or the like, for the purpose of rendering it more fluid at elevated temperatures and/or harder and/or less sticky at stripping temperatures.

As another aspect of my invention, I propose to employ a compatible reconditioning material derived preferably from the same base stock from which the stripping compound is made, but which has not been reduced to as low or hard consistency, or a liquid fraction separated from such a base stock or other petroleum oil. This material may be added to the bulk supply in regulated quantities to provide for the usual small losses encountered in use such as losses which occur when the adhering bristles are strained or otherwise treated to recover the asphaltic material for reuse, or hardening due to condensation or polymerization of the hydrocarbons. This reconditioning material, being compatible with the basic composition and inherently containing in addition a small percentage of lower boiling point or more liquid constituents which have been left in, makes up for the slight loss of volatiles that occurs at prolonged and repeated elevated temperatures, and it continues to keep the compound in a useable condition for long periods of time.

As specific embodiments of my invention and merely for illustrative purposes, I may cite the following examples:

(1) An asphaltic residue derived from cracking Mid-Continent crude oil at a temperature of 925° F. and 200 pounds per square inch pressure, was further reduced by fire and steam distillation until an asphalt was left which was hard at room temperature, but which was fluid at 300° F., having a Saybolt Furol (A. S. T. M. Standard Test D—88—38) viscosity of about 100 seconds at 300° F. This asphalt, heated to approximately 275° F., was applied as a coating to a hog which had been scalded; and when the coating had been artificially cooled by air, which was a matter of only a few seconds, it was easily stripped from the carcass. The bristles adhered to the asphalt and were removed from the carcass in the stripping operation.

During continued remelting and reuse, this asphalt was periodically reconditioned by the addition of small quantities of a product from the fire and steam distillation of the same cracked crude oil but which distillation was stopped while the product was semi-liquid. The addition of this reconditioning agent maintained the bulk supply of the carcass coating material in a satisfactory, usable condition and at the same time replenished the loss in volume which was inherent in this type of operation.

Other similar asphalts having viscosities of from about 50 to 200 seconds Saybolt Furol at 300° F., were successfully used and satisfactorily reconditioned.

(2) A propane precipitated asphalt, solid at room temperature, derived from crude oil and having a Saybolt Furol viscosity at 300° F., of 240 seconds, was heated to approximately 310° F., and sprayed onto hog carcasses and when cooled by spraying with water, was stripped from the carcasses, the asphalt at the same time removing the bristles which remained on the hog after a preliminary mechanical dehairing operation. This coating material could have been reconditioned as, for instance, in Example 1.

(3) A California crude oil was distilled by steam and vacuum at elevated temperatures until a hard asphalt was left, having an American Society for testing materials ring and ball softening point of 160° F. This asphalt was melted, hogs were dipped into the tank containing the asphalt and upon removal and cooling, the coating was stripped from the carcass, thereby removing the hairs adhering thereto.

(4) A residual asphalt was blended with about 10% of a hard petrolatum and was used as above with equally good results. This blend had a penetration at 77° F., using 100 grams for 5 seconds, A. S. T. M. method, of 6, and had an A. S. T. M. ring and ball softening point of 150° F.

In all of the above examples wherein the coating material was reconditioned, after extensive usage, the compound was found to be in a satisfactory condition for further usage.

I claim as my invention:

1. A process for the continued reuse of a depilatory in de-hairing edible carcasses to improve their marketability which comprises applying a heat liquefied coating material to the carcass, said coating material comprising essentially a bituminous material, cooling the coating, then removing the cooled coating and adhering hairs from the carcass, subsequently remelting said coating material, removing the insoluble solids therefrom, and adding a reconditioning material to said coating material comprising a normally more fluid bituminous substance compatible with the base coating material to preserve the coating in a condition to be reused.

2. A process for the continued reuse of a depilatory in de-hairing edible carcasses to improve their marketability which comprises applying a heat liquefied coating material to the carcass, said coating material comprising essentially a bituminous material, cooling the coating, then removing the cooled coating and adhering hairs from the carcass, subsequently remelting said coating material, removing the insoluble solids therefrom, and adding a predetermined relatively small quantity of reconditioning material to said coating material comprising a normally more fluid bituminous substance derived from substantially the same base stock as the original coating material to preserve the coating in a condition to be reused.

3. A process for the continued reuse of a depilatory in de-hairing edible carcasses to improve their marketability which comprises applying a heat liquefied coating material to the carcass, said coating material comprising essentially a bituminous material, cooling the coating, then removing the cooled coating and adhering hairs from the carcass, subsequently remelting said coating material, removing the insoluble solids therefrom, and adding reconditioning material to said coating material comprising a liquid fraction of a petroleum oil to preserve the coating in a condition to be reused.

4. A method of depilating carcasses by means of a heat liquefiable coating material characterized by the ability to reuse the depilatory in the process upon resultant hardening thereof by addition of a compatible liquid petroleum material which comprises depilating said carcasses by means of a coating composed essentially of a bitumen, and subsequently reconditioning the coating material by addition thereto of a compatible, liquid, petroleum material.

5. A method of depilating carcasses by means of a heat liquefiable coating material characterized by the ability to reuse the depilatory in the process upon resultant hardening thereof by addition of a compatible liquid petroleum material which comprises depilating said carcasses by means of a coating composed essentially of asphalt, and subsequently reconditioning the coating material by addition thereto of a compatible, liquid, petroleum material.

6. A process for the continued reuse of a depilatory in de-hairing edible carcasses to improve their marketability which comprises applying a heat liquefied coating material to the carcass, said coating material comprising essentially a cracked asphalt, cooling the coating, then removing the cooled coating and adhering hairs from the carcass, subsequently remelting said coating material, removing the insoluble solids therefrom, and adding a reconditioning material to said coating material comprising a normally more fluid bituminous substance compatible with the base coating material to preserve the coating in a condition to be reused.

7. A process for the continued reuse of a depilatory in de-hairing edible carcasses to improve their marketability which comprises applying a heat liquefied coating material to the carcass, said coating material comprising essentially a bituminous material which is fluid at a temperature of from about 250° F. to about 350° F., cooling the coating, then removing the cooled coating and adhering hairs from the carcass, subsequently remelting said coating material, removing the insoluble solids therefrom, and adding a reconditioning material to said coating material comprising a normally more fluid bituminous substance compatible with the base coating material to preserve the coating in a condition to be reused in like fluid condition at said temperature.

GENE ABSON.